(12) United States Patent
De Abreu (10) Patent No.: US 7,567,056 B2
(45) Date of Patent: *Jul. 28, 2009

(54) QUANTUM GENERATOR AND RELATED DEVICES OF ENERGY EXTRACTION AND CONVERSION

(75) Inventor: Paulo Emmanuel De Abreu, Curitiba (BR)

(73) Assignee: Guacemmi Participacoes Societarias, LTDA., Curitiba (BR)

( * ) Notice: Subject to any disclaimer, the term of this patent is extended or adjusted under 35 U.S.C. 154(b) by 447 days.

This patent is subject to a terminal disclaimer.

(21) Appl. No.: 11/218,365

(22) Filed: Sep. 2, 2005

(65) Prior Publication Data
US 2006/0232246 A1 Oct. 19, 2006

Related U.S. Application Data

(63) Continuation-in-part of application No. PCT/IB2004/050206, filed on Mar. 5, 2004.

(30) Foreign Application Priority Data

| Mar. 6, 2003 | (BR) | ................................ C1 9705871 |
| Feb. 2, 2004 | (BR) | ................................ C2 9705871 |
| Feb. 17, 2004 | (BR) | ................................ C3 9705871 |

(51) Int. Cl.
*H01M 10/44* (2006.01)
*H02J 7/00* (2006.01)

(52) U.S. Cl. ........................ 320/101; 320/130; 320/137; 429/152; 429/99; 361/659; 341/143

(58) Field of Classification Search .................. 320/101, 320/130, 137; 429/99, 152; 361/659
See application file for complete search history.

(56) References Cited

U.S. PATENT DOCUMENTS

| 5,227,263 A * | 7/1993 | Blier ............................ 429/99 |
| 5,801,515 A | 9/1998 | Chen et al. |
| 6,294,893 B1 * | 9/2001 | de Abreu ..................... 320/101 |
| 6,477,028 B1 | 11/2002 | Pinto |
| 6,751,083 B1 | 6/2004 | Gleiter et al. |
| 2006/0255991 A1 | 11/2006 | De Abreu |

FOREIGN PATENT DOCUMENTS

| DE | 35 41 084 A | 8/1987 |
| EP | 0 644 604 A | 3/1995 |
| JP | 2001 023682 A | 1/2001 |
| WO | WO 97/32384 A | 9/1997 |

* cited by examiner

*Primary Examiner*—Adolf Berhane
*Assistant Examiner*—Yalkew Fantu
(74) *Attorney, Agent, or Firm*—Lando & Anastasi, LLP (57) ABSTRACT

A quantum generator and related devices of energy extraction and conversion based upon the interaction of light and matter using a constructive arrangement of at least two metallic reservoirs with high ratios between the surface area and the mass of metal from which the metallic reservoirs are formed. The at least two metallic reservoirs are submitted to tension and compression states creating thermo potentials on the free electron gas. In one embodiment, a quantum capacitor is formed by at least two porous plates between pairs of batteries that are submitted to tension and compression states.

7 Claims, 10 Drawing Sheets

QUANTUM GENERATOR AND RELATED DEVICES OF ENERGY EXTRACTION AND CONVERSION

CROSS REFERENCE TO RELATED APPLICATIONS

This application is a continuation-in-part of International Application Number PCT/IB2004/050206, filed on Mar. 5, 2004, which designated the United States (US) and claims priority to Brazilian Application Number C1 9705871-8 filed Mar. 6, 2003, Brazilian Application Number C2 9705871-8, filed Feb. 2, 2004, and Brazilian Application No. C3 9705871-8, filed Feb. 17, 2004. The entire disclosure of International Application Number PCT/IB2004/050206, as initially filed on Mar. 5, 2004, is hereby incorporated by reference in its entirety.

BACKGROUND OF THE INVENTION

1. Field of the Invention

This invention relates to quantum generator devices for energy extraction and conversion by means of the interaction between light and matter obtained when particular arrangements of isolated free electron gas reservoirs with high area-to-mass ratio are placed under compression and placed under tension.

2. Discussion of the Related Art

The purpose of energy generators is to maintain a defined electromechanical force between either terminals of an electric charge or any electromechanical device to move, heat, illuminate, resonate or to supply energy for any human intention, including the process of charge and discharge of batteries through energy transformation.

The methods for charging batteries (the term "battery(ies)", unless otherwise perceived by the context, is used in this document to refer to one or more electrochemical cells, electrically connected in an appropriate series and/or parallel arrangement, and more particularly to secondary batteries, also known as "rechargeable batteries," "storage batteries," or "accumulators") are well known. The most conventional method for charging batteries consists of applying direct current to the batteries. Although simple, this method can cause an increase in the temperature of the batteries and an excess of gases, requiring a long period for the total recharge of the battery.

A more improved battery charging method is disclosed by PODRAZHANSKY in International Application No. PCT/US97/02729 (WO 97/32384) applied to nickel metal hydride, lead acid, lithium ion, nickel cadmium or nickel metal hydride batteries. This method involves altering a first wait period by applying, during the first wait period, a first pack of high frequency current pulses to the battery with the first pack of pulses having a frequency selected to enhance mixing of the electrolyte.

Chen et al proposes in U.S. Pat. No. 5,801,515 a method and apparatus for rapidly charging a battery using a multiple-frequency composite current without a discharging process.

In U.S. Pat. No. 6,388,425, PETROVIC presents a waveform with long period recharging pulses of approximately 60 to 180 seconds, separated by two rest periods interspersed by a discharge period of 10 to 20 seconds.

In addition to the effort in developing new recharge processes for batteries, many companies try to develop batteries with new structural characteristics in order to attain better performance. Matsushita Industrial Electrical Co. Ltd., for instance, applied for: (i) JP Patent Application No. 11-194008 (Publication No. 2001-023682, TAKEHIRO et al, see also WPI/Derwent document AN2001-207435/XP002306657) wherein is disclosed a sealed lead-acid battery containing a positive electrode plate and a porous lead negative electrode plate of specific dimensions aiming to obtain high discharge characteristics; and (ii) EP Patent Application No. 0644404A1 (MORISHITA et al) that discloses a sealed alkaline storage battery with means for reducing the distortion of the cell containers due to the generation of heat in the cell during the electrode reaction and the Joule's charging and recharging process.

Indeed, during the electrode reaction and the charging and recharging process not only is the cell container subject to deformation, but also the battery plates. In European Patent No. EP1228544B1 (PALUMBO) there is a concern about the straining of battery plates, and more particularly to the creep deformation (growth) caused by grain boundary sliding that would reduce the performance and the life-time of the battery. The suggested approach is to alter the structure of the grain boundaries directly in the material so that the electrodes of the lead-acid batteries obtain a superior resistance to creep deformation, intergranular corrosion and cracking.

On the other hand, GLEITER et al (Charge-Induced Reversible Strain in a Metal, Science Magazine, Apr. 11, 2003, Vol. 300, p.312-315) describes that reversible strain amplitudes can be induced in metals by introducing electrical charges, mainly in metals with extremely high surface-to-volume ratio; while in DE Patent Application No. 19952447 C1(PCT/EP00/10079-WO01/33590) GLEITER et al discloses a device with an electrode, a spongiform nanostructure metal permeable layer where the overwhelming majority of atoms are located in easily accessible surfaces, an electrolyte, and a means for applying a voltage providing optical or mechanical effect suitable to several applications.

Figure 1:
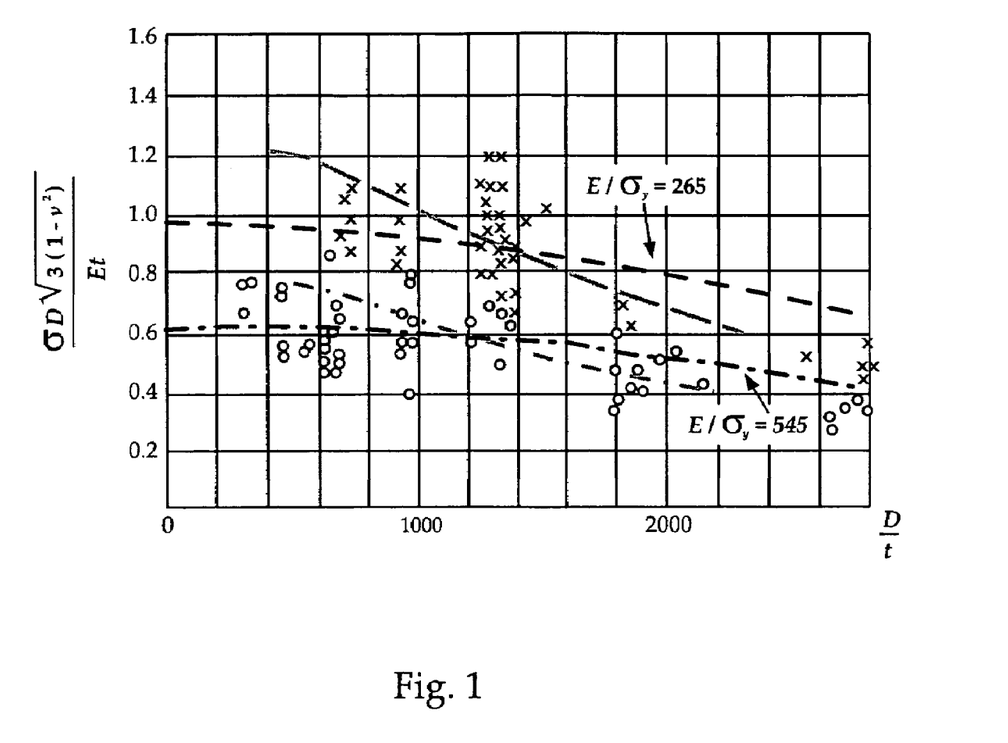
FIG. 1 is a graph from page 470 from the book Theory of Elastic Stability (TIMOSHENKO, et al. New York: McGraw-Hill, Second edition, 1963), that, due to the nature of the invention and for better understanding, has the abscissa's scale changed to the diameter-to-thickness ratio (D/t), showing that even different metallic alloys have the same critical curve when they have the same D/t and $E/\sigma_y$. ratios.

Issues on reversible deformations of metals are mentioned by TIMOSHENKO, et al (Theory of Elastic Stability. New York: McGraw-Hill, Second Edition, 1963. p. 470-485) when relating experimental results on thin shells suffering reversible deformations, i.e., simultaneously placing under compression and under tension the symmetrical sides of metallic shells with a high ratio between their diameter and their thickness (D/t) through bending tests, concluding that "the discrepancy between experiment and theory is larger for thinner shells." He explains through graphics and formulas that different metallic alloys have the same critical curve when they have the same ratios of D/t and $E/\sigma_y$. Therefore, the critical curve for both brass and steel is the curve "545" given by the relation $E/\sigma_y=545$, as shown on FIG. 1. With the results found on axial-compression and bending tests on thin tubes of steel and brass, the author concludes that the values found for the critical stress are about 1.4 times those found in axial-compression tests for all values of diameter/thickness (D/t).

New energy sources have been searched as alternatives of the background art so far presented, such as the zero point energy (ZPE). PUTHOFF ("Can the Vacuum be Engineered for Space flight applications?", NASA Breakthrough Propulsion Physics Workshop, Aug. 12-14, 1997, NASA Lewis Research Center, Cleveland, Ohio), recognizes that the "quantum vacuum is an enormous reservoir of untapped energy, with energy densities conservatively estimated by Feynman and others to be on the order of nuclear energy densities or greater." Therefore, the question posted by PUTHOFF is: "Can the ZPE be 'mined' for practical use?" Further, PUTHOFF mentions that several experimental formats for tapping the zero point energy for practical use are under investigation in his laboratory. For instance, U.S. Pat.

No. 6,665,167 by PINTO, adopts the Casimir effect; that is mechanical forces to generate energy.

SUMMARY OF THE INVENTION

In accordance with one embodiment of the present invention, a quantum generator device is provided. The device comprises an external metallic shell, and an internal metallic shell coupled to the external metallic shell by bolts and nuts. The bolts and nuts are arranged to place the external metallic shell in tension and the internal metallic shell in compression. The internal metallic shell is electrically isolated from the external metallic shell by dielectrics and the internal metallic shell and the external metallic shell each have a high diameter-to-thickness ratio.

In accordance with another embodiment of the present invention, a quantum generator device is provided, comprising an external metallic shell having a first end and a second end, a first dielectric disposed at the first end of the external metallic shell, a second dielectric disposed at the second end of the external metallic shell; and a plurality of metallic bars disposed within the external metallic shell, electrically isolated from the external metallic shell, and extending through the first dielectric and the second dielectric. A plurality of fasteners is attached to ends of the metallic bars extending through the first dielectric and the second dielectric and are arranged to place the external metallic shell in compression and the plurality of metallic bars in tension. The external metallic shell has a high diameter-to-thickness ratio.

According to another embodiment, a quantum generator device is provided. The quantum generator device comprises first and second negative porous lead plates and third and fourth positive porous lead dioxide plates, the first, second, third, and fourth plates being composed of micro-particles or particles having smaller than micro-particle dimensions, having a high area-to-mass ratio, and being immersed in a preferentially doped acid solution. The first plate and the third plate are arranged in a first battery, and the second plate and the fourth plate are arranged in a second battery, the first and second batteries operating as quantum capacitors. At least one of the first and third plates and the second and fourth plates is placed into a compressed state by a first source having a first polarity and wherein at least the other of the first and third plate and the second and fourth plates is placed into a tensioned state by a second source having a second polarity that is a reverse of the first polarity interspersed in time and space.

In accordance with a further embodiment, wherein the above described quantum generator device performs a process for energy extraction and conversion characterized by alternating cycles of discharge by the second source and recharge by the first source, an activation sequence is provided that includes four steps. In a first step, the first source is connected between the first plate and the third plate compressing the first plate, and the second source is connected between the second plate and the fourth plate placing the second plate under tension. In a second step, the second plate is connected to the first plate and the third plate is connected to the fourth plate. In a third step, the first source is connected between the second plate and the fourth plate compressing the second plate, and the second source is connected between the first plate and the third plate placing the first plate under tension. In a fourth step, the first plate is connected to the second plate and the third plate is connected to the fourth plate. In a next period the first, second, third and fourth steps are repeated.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The solutions presented in the Background have several disadvantages due to the technical problems described below.

The solutions provided by PODRAZHANSKY, PETROVIC, CHEN, TAKEHIRO and MORISHITA do not take into account charge-induced reversible strain in the battery's electrodes and do not uses free electron gas reservoirs with high area-to-mass ratio placed under compression and placed under tension. Moreover, they neither teach nor suggest the possibility of generating energy.

It is important to point out that despite GLEITER disclosing in the aforementioned Science Magazine article that the recharge and discharge of the spongeous electrode produces reversible elastic deformation on metals, he did not relate such as it to battery processes or to elastic mechanisms on metals of spongeous electrodes, such as lead acid batteries.

Furthermore in his patent, GLEITER adopted only one electrode, one permeable porous layer, one electrolyte, and a means for applying voltage; and mentioned that a suitable electrode would comprise a high conductive metal. GLEITER uses only one electrode, one spongiform permeable layer, one electrolyte and a means for applying a voltage, without providing an arrangement with two batteries, and more particularly two lead-acid batteries.

THIMOSHENKO, also does not show a solution for the technical problem of the discrepancy between experiment and theory for thinner shells, and does not find industrial applicability for the 40% increase of the critical stress of pure bending when compared to axial-compression found for all values of ratio of diameter and thickness (D/t). However, at a given temperature, the major problem is that the metals could not change intrinsic properties such as critical stress without the free electron gas causing a dimension deformation on the material or vice versa. Like other researchers, he did not find a practical applicability to generate energy from the zero point energy.

PALUMBO's effort in providing a solution in order to enhance resistance against such deformations goes against the advantage of using such deformations to generate energy.

The research and patents related and published by PUTHOFF also do not show industrial applicability desired for the use of zero point energy, and he concludes that "there still are unforeseen breakthroughs to be crossed over." For example, the PINTO patent does not allow larger zero point energy generation because there are technological limitations to produce the required plates to use the Casimir effect in large scale. So far as described, it does not relate to battery processes.

Due to these related problems and other limitations, batteries and energy generators available today have the disadvantage of only being able to transform usual energies. The hydroelectric and fossil fuel sources of energy have high costs and result in significant damage to the environment; nuclear energy is a declining source because of the high cost of generation and extreme operational risks as can be observed as a result of catastrophes reported by the worldwide press in the past decades; and wind energy, tidal energy, solar cells, and fuel cells have high costs for the generation of guaranteed limitless energy.

So, the solutions described in the Background still have many technical problems not allowing the generation of energy from the zero point energy (ZPE). All available batteries are basically energy consumers because the process of charge and discharge are irreversible, i.e., they actually are energy dissipaters. Additionally, the toxic waste generated due to the limited lifetime of battery and batteries cause huge environmental problems.

To solve the related technical problems, certain embodiments of the present invention are directed to a quantum generator and related devices of energy extraction and conversion through the interaction of light and matter, using a constructive arrangement of at least two metallic reservoirs with high ratios between the surface area to the mass of the metal. In certain embodiments, the two metallic reservoirs may be submitted to tension and compression states creating thermo potentials on the free electron gas.

A first embodiment of a quantum generator device using the above technical solution is an elementary arrangement formed by an external metallic shell under tension, coupled to an internal metallic shell under compression by bolts and nuts isolated by dielectrics, generating energy through a predominant photoelectric process.

A second embodiment of the quantum generator device, includes pairs of batteries, at least two, operating as quantum capacitors, and a process of submitting at least one of the metallic electrodes of one of the batteries to a tensioned state in one step, while at least one of the metallic electrodes from the other battery are submitted to a compression state in the same step. In the following step the electrodes under tension and under compression are both interconnected. This new process operates, preferentially with lead, in the variation of the electron gas thermo potentials from zero Kelvin (−273.15° C.) to two times the absolute operation temperature, preferentially close to Zero Kelvin (−273.1 5° C.) and close to 600 Kelvin (326.85° C.), in the whole cycle.

In order for those skilled in the art to easily reproduce embodiments of the present invention in the several described arrangements with adequate operational performance, aspects and parameters of a quantum generator, and related devices of energy extraction and conversion, are discussed herein.

First, at room temperature of approximately 300K (26.85° C.), metals under tension increase in volume and metals under compression reduce in volume in accordance with:

| Symbol | Description |
| --- | --- |
| P | Applied load |
| A | Cross sectional area (before loading) |
| l | Length (before loading) |
| E | Modulus of elasticity |
| ν | Poisson's Ratio |
| $\sigma_y$ | Yield Stress = P/A |
| $\epsilon$ | Unit longitudinal strain = $\sigma_y$/E |

Therefore each cubic meter of volume increases to (1−2 ν∈+∈) cubic meters under tension and decreases to (1+2 ν∈−∈) under compression.

Metals under compression increase both free electron concentration in space as well as their Fermi energy, and metal under tension decreases both free electron concentration in space as well as their Fermi energy in accordance to the expression:

$$E_F = \frac{h^2}{2m}\left(\frac{3n}{8\pi}\right)^{\frac{2}{3}}$$

Where:

| Symbol | Description |
| --- | --- |
| $E_F$ | Fermi Energy |
| h | Planck Constant |
| m | Electron Mass |
| n | Free electrons Concentration |

The Fermi Energy increases with an increase of free electron concentration in space, due to the fact that electrons fill the available energy states in a way that there are two electrons by state according to the Pauli exclusion principle, until the Fermi Energy level is reached.

Figure 2:
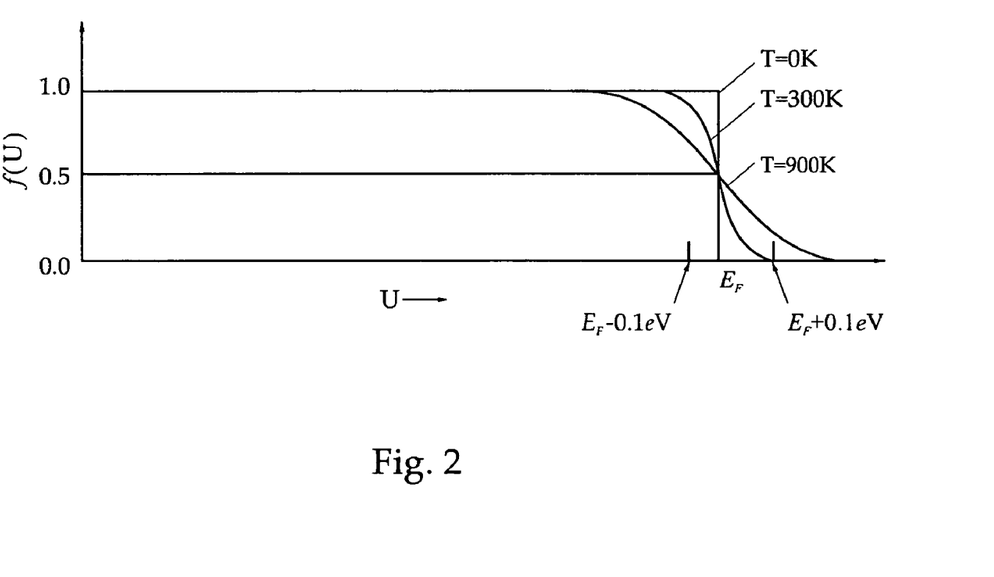
FIG. 2 is the Fermi-Dirac distribution function $f(U)$ at Zero Kelvin (−273.15° C.) and other temperatures, showing the probability of finding an electron at a given state of energy U.

According to Fermi-Dirac distribution $f(U)$, as shown in the graphic of FIG. 2, the probability of finding an electron at a given state of energy U is calculated by the expression:

$$f(U) = \frac{1}{e^{(U-E_F)/kT} + 1}$$

In accordance with the graph of $f(U)$ versus the state of energy U at any given temperature T>0 K, when U is equal to $E_F$, the probability of finding an electron $f(U)$ is 50%, as shown in FIG. 2.

Significant variations in the Fermi-Dirac distribution occurs around the high Fermi Energy and are caused by temperature or by the unit longitudinal strain created on the material under tension or under compression.

FIG. 2 demonstrates that just a small fraction of states with energy levels above the Fermi Energy is occupied while the same small fraction with energy levels below the Fermi Energy is unoccupied.

The controlled excitation of this fraction of energy levels slightly above the Fermi Energy is obtained through compression of one of the shells, coupled with the excitation of the same fraction of electrons with levels of energy slightly below Fermi Energy obtained through tension of the other shell, increased by the high diameter-to-thickness ratio. This allows the reordering of the excitation states such that the probability $f(U)$ for $U=E_F$, changes from 50% on each shell to $f(E_F+\Delta E_F)$ in one of the shells and $f(E_F-\Delta E_F)$ in the other one. The ideal is to obtain $f(E_F+\Delta E_F)$ equal to zero and $f(E_F-\Delta E_F)$ equal 100% which would result in the total reorientation of the free electrons gas of the metallic shells.

Taking account that quantum physics shows the exact fraction of excited electrons with levels of energy slightly above and below the Fermi Energy is calculated by $9kT/16 E_F$, it has been experimentally verified that the unit longitudinal strain could be written as $\in=\Delta l/l=\sigma_s/E=9kT/32 E_F$. Since the total energy of deformation of the shell is given by $U=P l \in/2=1 A\sigma^2/2E$, and that the compression stress $\sigma_C$ applied is equal to the tension stress $\sigma_t$, therefore $\sigma_C=\sigma_t=\sigma$. Because the energies are proportional to the squares of the respective stresses, we have $\sigma_{critic}^2=\sigma_{compression}^2+\sigma_{tension}^2$, and that $\sigma_{critic}^2=2\sigma^2$ and therefore $\sigma_{critic}=\sigma\sqrt{2}$, which means $\sigma_{critic}=1.414\sigma$.

Secondly, the photoelectric effect in a bigger spectral band is now discussed. The energy E of the package or photon is related to its frequency v in accordance with the equation: $E=hv$. In the photoelectric process a photon is completely absorbed by an electron in the photo cathode. When an electron is emitted from the surface of the metal, its kinetic energy K is given by $K=hv-\omega$, where hv is the energy of the absorbed incident photon, and $\omega$ is equal to the work necessary to remove the electron from the metal.

The work ($\omega$) must be expended to overcome the attractive fields of the surface atoms and the losses of the kinetic energy due to internal electron collisions. Some electrons are more strongly bonded than others; some lose energy due to collisions in their trajectory. In the case of a weaker bond and no internal loses, the photoelectron will emerge with the maximum kinetic energy $K_{MAX}=hv-\omega_0$ where $\omega_0$ is the characteristic energy of metal's work function. It is the minimum energy necessary for an electron to cross the metal surface and escape the attractive forces that normally bind the electron to the metal in the absence of mechanical stress. Therefore $hv_0=\omega_0$, and as $K_{MAX}=eV_0$, we have that $eV_0=hv-\omega_0$.

Figure 3:
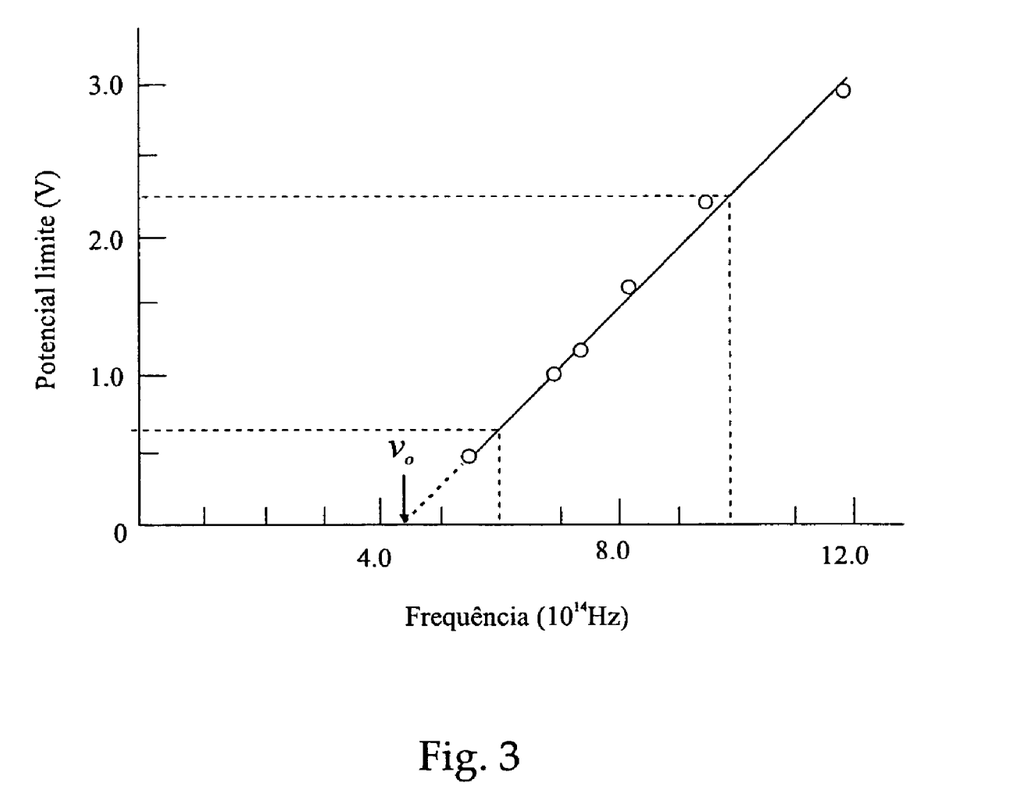
FIG. 3 represents the results of MILIKAN's measurements of the cut-off potentials due to the incidence of light over a sodium surface at several frequencies, taken from EISBERG et al (*Fisica Quântica—Quantun physic of atoms, molecules, solids nuclei and particles,* translation of RIBEIRO et al. Rio De Janeiro: Campus, 1994, p. 53)

The graph shown in FIG. 3 shows the results of the measurements of the kinetic energy of sodium at several frequencies. The threshold of the frequencies without mechanical excitation is $4.39\times10^{14}$ Hz.

Up to now, an electron in a metal has been treated as a particle in a box. Implicitly we consider that electrons do not escape metal because the "box of energy" has very high walls. However, experience shows that electrons can escape metals as in the photoelectric effect, in thermo-ionic emissions, etc., and through the inventive concept of this technology, where the invention modifies the potential energy function of a metal in a natural state to a function of potential energy of a metal which is excited through mechanical stresses associated with the surface area expressly enlarged through the use of adequate geometries and technologies, as disclosed in this patent application.

Figure 4A:
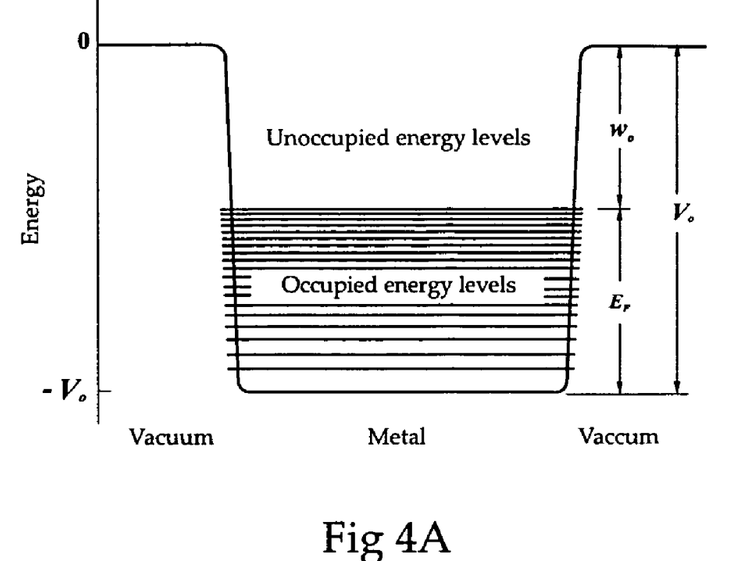
FIG. 4A represents the conduction electron average potential energy in a metal free of mechanical stress, from EISBERG et al (*Fisica Quântica—Quantun physic of atoms, molecules, solids nuclei and particles,* translation of RIBEIRO et al. Rio De Janeiro: Campus, 1994, p. 518)

For electrons within a metal, the energy function is approximately constant. Near the surface of the metal, the energy grows quickly and reaches its maximum constant value outside the metal boundary. If we assign a value of zero as the potential energy of an electron outside the metal, then $-V_0$ will represent the depth of the well of resultant potential as shown in the graph of FIG. 4A.

We can determine $V_0$ from photoelectric experiences specifically, as shown in graph of FIG. 3, due to the fact that there exists a cutoff frequency $v_0$ below which, photons cannot eject electrons of a metal in a natural state, that is, free of mechanical stress.

This suggests that the more energetic electrons on the surface of a metal are at the threshold level of energy $hv_0$ below of the top of the potential well. The fact that photocurrent grows quickly when the energy of the photon rises above of the threshold value, demonstrates an abrupt growth in the number of electrons with less kinetic energy than within the metal. This corresponds precisely with the Fermi-Dirac distribution function. The more energetic electrons have a kinetic energy of $E_F$ and many other electrons have slightly less energy.

Technologies are described herein, which obtain a substantial quantity of more energetic electrons that are on the surface of a metal with energies less than $hv_0$ below of the top of the potential well, by being excited to the energy above $E_F$.

At T=0 K (−273.15° C.), all states are populated at an energy level $E_F$ above the bottom of the well, with the more energetic state having a total energy $-hv_0$, that is:

$$-eV_0+E_F=-hv_0.$$

Figure 4B:
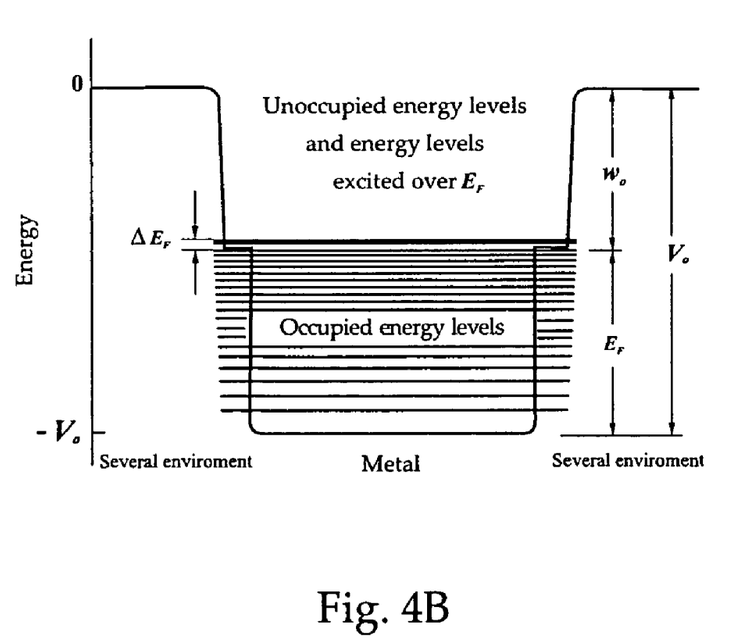
FIG. 4B represents the conduction electron average potential energy in a metal excited by mechanical stress.

As $eV_0=E_F+\omega_0$, added to the fact of that at a temperature of 300 K (26.85° C.), some portion of the excited electrons have an energy of $\Delta E_F$ slightly above of $E_F$ that can be achieved through mechanical stress. Given that $eV_0=E_F+\Delta E_F+\omega_0$, it is possible to modify the form of the potential function of metals free of stress which has already been established in the photoelectric effect as shown in the graph of FIG. 4A, to the potential function of metals under stress created through mechanical forces in accordance with the graph of FIG. 4B.

By governing the process controlling the fraction of excited electrons at levels of energy slightly above and below Fermi Energy with the following proprieties and technical parameters that should be considered at this operation: (a) temperature; (b) metal valence; (c) elastic stress metal state; (d) yield-point to modulus of elasticity ratio of metals $\sigma_y/E$; (e) diameter-to-thickness ratio D/t; (t) surface area; (g) increase of 41.4% of the critical compressive or tensile stresses in two coupled metallic shells; a first embodiment of a quantum generator provides a technical solution and industrial applicability for the resistance increase of metallic shells related by TIMOSHENKO, through the inter-relationship of the thermal, photonic, elastic and electrical energies, for the generation of the Zero Point Energy (ZPE).

From this, we have an equivalent effect of zero Kelvin (−273.15° C.) with the tension stress caused by the first embodiment of the generator, affecting only the mass of the electronic gas. Thus, it is more efficient than conventional industrial processes where all the metal atomic parts are cooled. However, even using less metal mass, more expressive results are found in embodiments of a quantum generator that use a spongeous electrode.

To illustrate and facilitate understanding, we consider the elastic (mechanical), thermal and electrical energies associated with reservoirs of free electrons with high surface area-to-mass ratio. For practicality, the free electron reservoir chosen as an illustrative example was a spongeous lead plate because of numerous characteristics: it is easy to obtain and to handle, its properties are easily found in a vast body of literature, and also this metal is particularly interesting because of its extremely high relation between the contact area and the active mass of the pure metal.

Some characteristics of the porous lead plate and microcrystals are:

| Description | Value | Symbol |
|---|---|---|
| Dimensions of the plate | 0.120 m × 0.140 m × 0.002 m | |
| Yield strength | $12.7 \times 10^6$ Pa | $\sigma_y$ |
| Modulus of elasticity | $17.4 \times 10^9$ Pa | E |
| Mass of pure lead | $8.7 \times 10^{-2}$ kg | M |
| Mol of lead | 207.21 | M |
| Density of lead | $11.34 \times 10^3$ kg/m$^3$ | P |
| Volume of lead | $7.67 \times 10^{-6}$ m$^3$ | $V = m/\rho$ |
| Specific heat of lead | 128 J/kg° C. | c |

Determination of the mechanical energy ($E_M$) of a porous lead plate, in order to submit it to the limit of the elastic region: $E_M = \frac{1}{2} \sigma_y^2 V/E = \frac{1}{2} (12.7 \times 106)2 (7.67 \times 10^{-6})/(17.4 \times 10^9) = 3.55 \times 10^{-2}$ J.

The thermal energy to heat the mass of the free electron gas from the porous lead plate ($m_G$) from a temperature of 0 K (−273.15° C.) to 300 K (26.85° C.) is approximately $E_T = 1.77 \times 10^{-2}$ J, according to: mG=(87/207.2) (6.02×10$^{23}$) (9.11×10$^{-31}$) (2)=4.61×10$^{-7}$ kg; and $E_T$=(4.61×10$^{-7}$) (128) (300)=1.77×10$^{-2}$ J. So, it is equal to the half of the value of the mechanical energy ($E_M$).

So, porous lead was chosen, because in addition to being easier to check that the unit longitudinal strain (∈) is equal to half of the value of the fraction of excited electrons with energy slightly above and below $E_F$, less energy is used to orient the electron gas of porous lead due to the low yield point and a high creep effect at room temperature.

Determination of the electrical energy ($E_E$) of a porous lead plate in an acid solution: considering the value of energy of a capacitor formed by a negative plate with dimensions 0.120 m×0.140 m×0.002 m in an aqueous 1250 kg/m$^3$ solution of $H_2SO_4$ at a temperature of 300 K (26.85° C.), the capacitance is determined experimentally to be 0.29 F. This is the capacitive effect of the electron gas. It is important to emphasize that we are considering a quantum capacitor, because there is no classical capacitor with a dielectric that is a good conductor as an electrolyte solution with strong acid.

The capacitance value above can be obtained from the discharge curve between two negative porous lead plates inside the same cell with a half-life time of 0.400 seconds using a resistive charge of 2 Ω between the two plates and using a digital oscilloscope in real time.

The measurements can be confirmed with proximate results through the equation: $C = AC_A ve/E_{Pb}$, where:

| Value | Description |
|---|---|
| $A = 2 \times 0.12 \times 0.14 = 3.36 \times 10^{-2}$ m$^2$ | Surface area of the plate faces |
| $C_A = 9.5 \times 10^{18}$ atoms/m$^2$ | Atomic density of plain Pb (111) |
| v = 2 | Valence of Pb |
| $e = 1.60 \times 10^{-19}$ C | Electron charge |
| $E_{Pb} = 0.35$ V | Electrode Potential of Pb |

According to the above equation, the capacitance from the effect of the gas of free electrons is 0.29 F, confirming with good proximity the value obtained experimentally.

Therefore, the electrical energy EE confirmed in theory as well as through experiments is given as: $E_E = \frac{1}{2} C E_{Pb}^2 = \frac{1}{2} (0.29)(0.35)^2 = 1.78 \times 10^{-2}$ J. Therefore, the electrical and thermal energy are equal, representing each fifty percent of the mechanical energy. This relationship may be used in order to optimize the mass of spongiform electrodes.

The discharge of the projected surface electrical charge of the porous lead electrode causes an equivalent effect of zero Kelvin (−273.15° C.). This discharge affects the mass of electron gas faster, causing a more efficient process than the one adopted in the first described embodiment of the quantum generator. In this way, it makes possible the creation of a second embodiment of a quantum generator.

The quantum generator and related devices of energy extraction and conversion disclosed herein use natural energy available anywhere we live with attractive advantages of low cost, no adverse environmental impact, and no risk of harm to people, plants or animals by achieving a bi-orientation of the free electron gas of metals, which constitute a limitless supply of energy.

There are many advantages of the technology disclosed herein when compared with the art described in the Background because that art fails to address a result of the inter-relationship of the several energy forms as adopted in the inventive act of the quantum generator and related devices of energy extraction and conversion. This inter-relationship has a tremendous impact and applicability with technical, economic and environmental advantages, by the following effects, among others.

The pulses adopted as discharge pulses by those mentioned in the Background do not allow achieving energy generation, even on conventional batteries. The present invention allows adopting the correct discharge pulses as mechanical tension pulses controlled through the discharge of the electrical charge. This discharge increases the dimensions of the lead crystal lattice allowing the correct electrical charge to be recharged on the volume variation of the crystal lattice. This volume variation of the electrode crystal lattice is obtained between the tensioned state on discharge and the compressed state reached at the end of the recharge pulse. This method allows the advantage of faster and more efficient recharge process even on conventional batteries using more practical systems.

While normal recharge systems are applied to just one battery as related in all the aforementioned documents, the quantum generator and related devices of energy extraction and conversion described herein adopt several spongeous lead electrodes in more than one electrolyte environment that utilizes at least two batteries. These two batteries allow the bi-orientation of the free electron gas.

The environmental advantageous effects obtained with the present invention are very important. They allow enhancing at least four times the lifetime of existing batteries reducing, in the same way, four times the toxic waste. There is also the possibility of re-utilizing scraped batteries, increasing even more its importance for the environment.

With embodiments of the present invention the elastic metal energy is also used to generate the energy needed for practical use from the zero point energy on the discharge and recharge of batteries with the advantage of a higher efficiency with less material consumption.

Further, several advantageous effects are obtained:

Portable and stationary quantum energy generators may obviate the need for transmission lines that are vulnerable to bad weather are expensive, and cause environmental problems;

Quantum generators are virtually maintenance free with a long lifetime due to the low noise and no mechanical vibrations;

Quantum generators may be used in any environment because they do not heat or cause a smell; and Quantum generators require less material than other energy systems because they use a high-density energy source available anywhere, the zero point energy, with the same order of the nuclear energy density, or even larger.

To conclude, this technology could be easily and widely adopted, using recyclable material that is abundant in nature.

A preferred embodiment of the present invention is described herein as the second embodiment of a quantum generator device and basically consists of pairs of batteries, at least two, operating as quantum capacitors, and a process of submitting at least one of the metallic electrodes of one of the batteries to a tensioned state in one step, while at least one of the metallic electrodes from the other battery are submitted to a compression state in the same step. In a following step the electrodes under tension and under compression are both interconnected to release. This new process operates, preferentially with lead, in the variation of the electron gas thermo potentials from zero Kelvin (−273.15° C.) to two times the absolute operation temperature, preferentially close to Zero Kelvin (−273.15° C.) and close to 600 Kelvin (326.85° C.), in the whole cycle.

A first embodiment of a quantum generator device where the energy extraction and conversion is obtained through the interaction between light and matter by placing under compression and placing under tension free electron gas reservoirs with high area-to-mass ratio isolated from one another is now described in detail, these reservoirs being metallic shells.

Figure 5A:
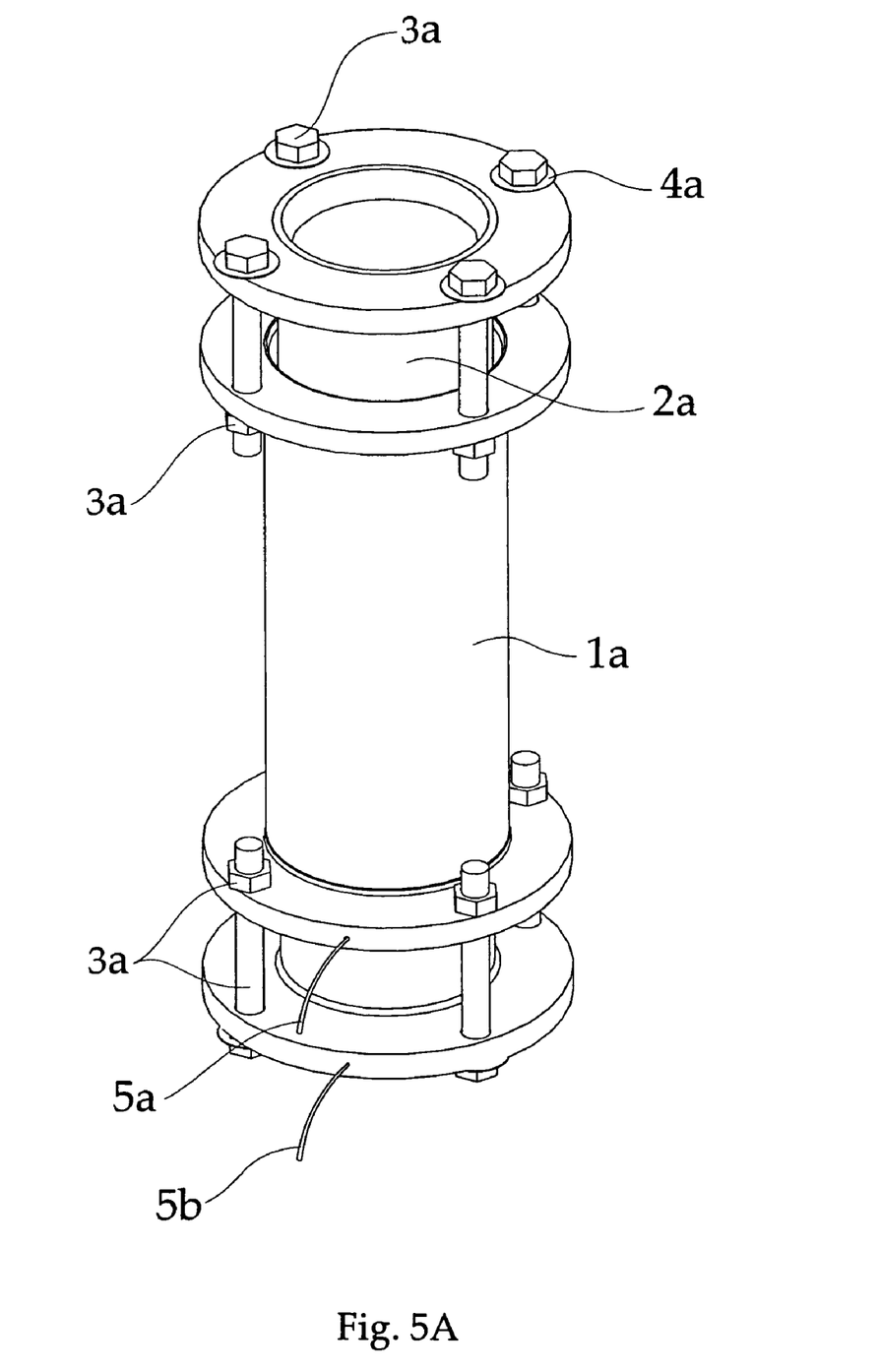
FIG. 5A represents the perspective view of a first embodiment quantum generator showing its components including bolts and nuts, an external metallic shell, an internal metallic shell, and insulators.
Figure 5B:
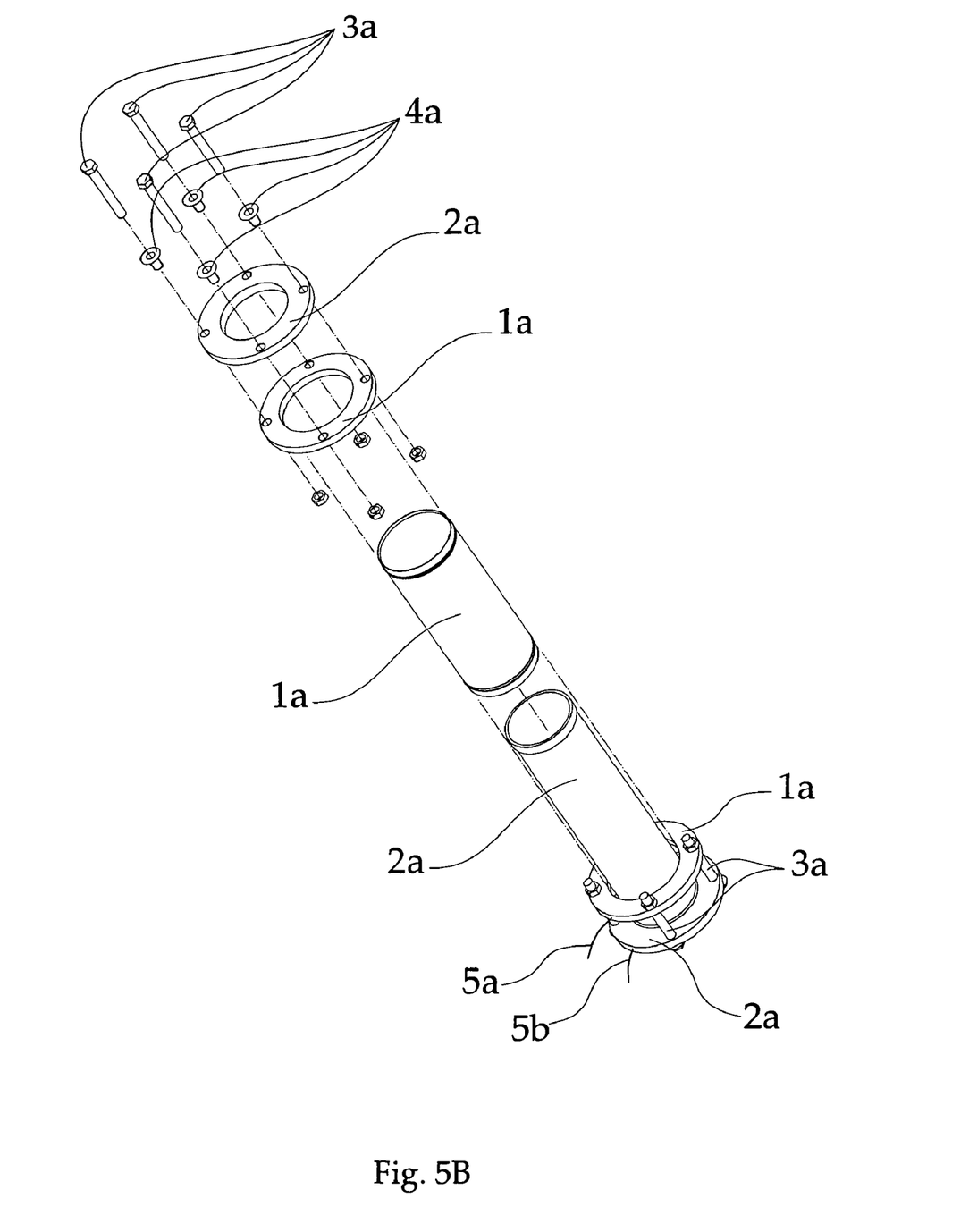
FIG. 5B represents the expanded perspective view of the first embodiment quantum generator.
Figure 5C:
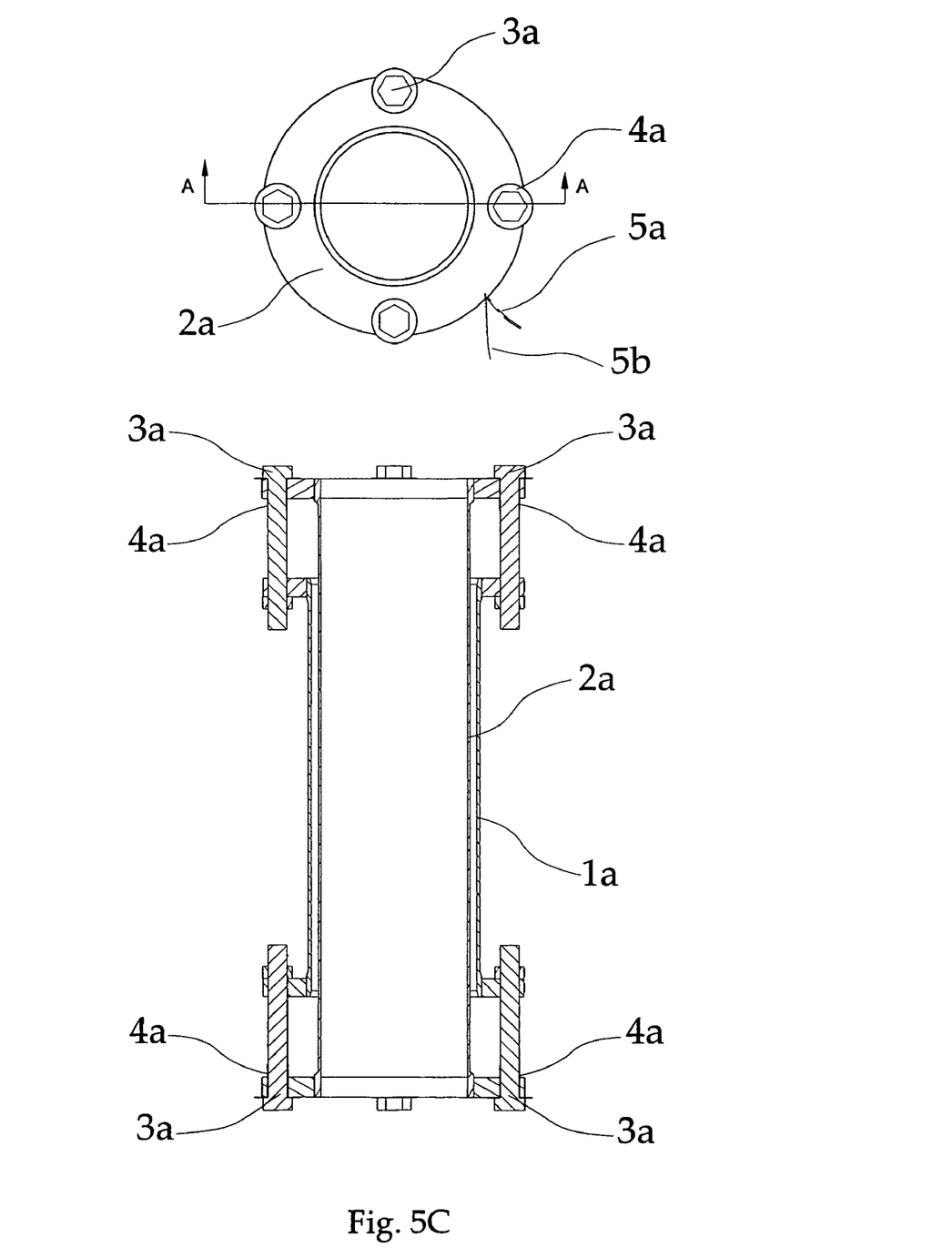
FIG. 5C represents a top view and a lateral section AA of the first embodiment quantum generator indicating its components.

The first embodiment of the quantum generator device, shown in FIG. 5A, 5B and 5C, is formed by an external metallic shell (1a), an internal metallic shell (2a), bolts and nuts (3a), dielectrics or insulators (4a), preferentially polymers, and electrical conductors (5a) and (5b) to connect a voltage measurement apparatus, such as a multimeter, to check the permanent transference of radiant energy.

In certain embodiments, the metallic shells (1a) and (2a) have high diameter-to-thickness ratio (D/t) associated with adequate relation between the yield strength and the modulus of elasticity of the metal ($\sigma_y/E$). In the illustrated embodiment of FIGS. 5A-C, both the internal metallic shell and the external metallic shell are cylindrical in shape, although other shapes may be considered.

The bolts and nuts (3a) place the external metallic shell (1a) under tension and the internal metallic shell (2a) under compression. It should be appreciated that in an alternative arrangement, the external shell could be under compression and the internal shell under tension. Between the bolts and nuts (3a) and the metallic shell (2a) are the dielectrics (4a) in order to insulate both shells. The radiant energy voltage generated is checked by, for example, a digital multimeter connected to the electrical conductors (5a) and (5b).

Figure 5D:
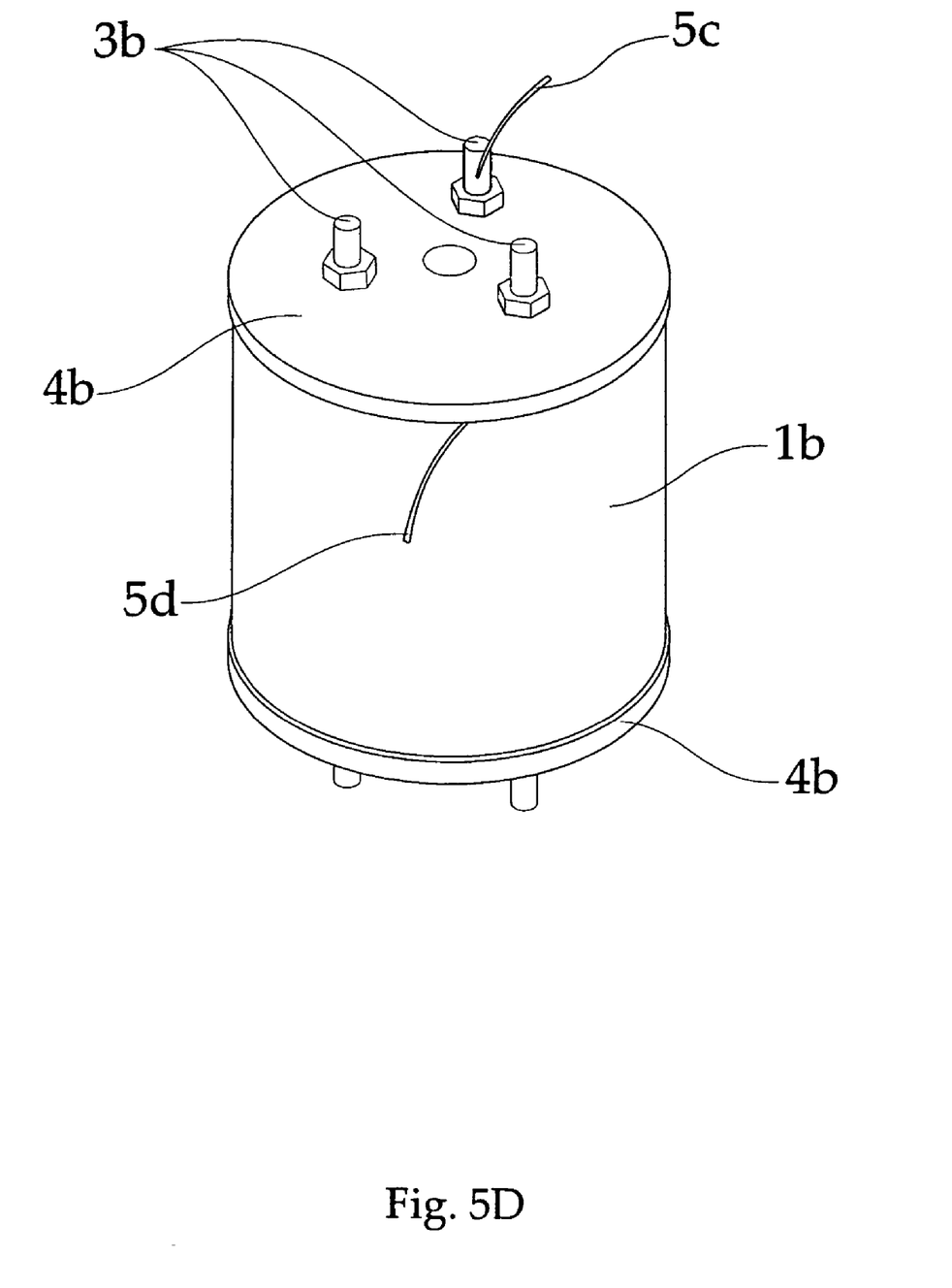
FIG. 5D represents a perspective view of a quantum generator in accordance with another embodiment showing its components including bolts and nuts, external metallic shell and insulators.
Figure 5E:
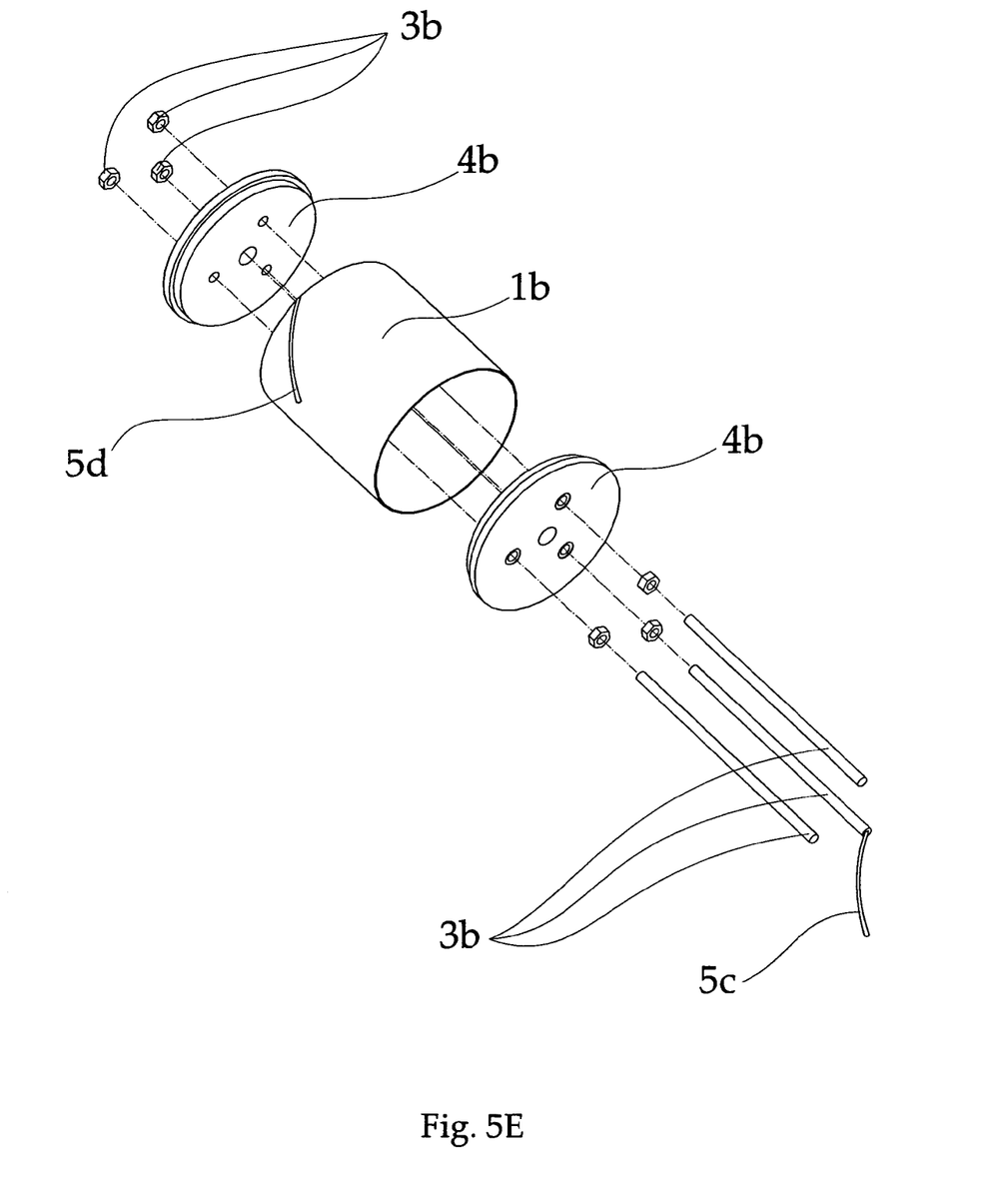
FIG. 5E represents an expanded perspective view of the simplified embodiment of the quantum generator of FIG. 5D.

Another simplified embodiment is shown in FIGS. 5D and 5E wherein the energy is obtained by placing under compression the metallic shell (1b) with high D/t ratio while placing under tension bolts (3b) that are isolated by a rigid polymer (4b) at bottom and top. The external metallic shell may be cylindrical in shape, as shown.

In the devices shown as FIGS. 5A, 5B, 5C, 5D and 5E, the metallic shells (1a), (2b) and (1b) and metallic bolts and nuts (3a) and (3b) typically have the same chemical composition. Further tests verified that it is also possible to achieve the desired industrialization with different chemical compositions of the components (1a), (2a), (1b), (3a) and (3b). The mechanical design can vary depending on the application, but for practicality, a better result is obtained using compressed shells joined to tensioned bars linked by a pair of isolators at both extremities.

For example, for the structural design of the embodiment of FIG. 5D with a Titanium shell: 0.085 m diameter; 0.0002 m thickness; and 0.090 m high; at room temperature and 70% humidity; it is possible to obtain $40 \times 10^{-9}$ Amperes per bolt.

Thus, the described embodiments of the quantum generator are an elementary form with an innovative constructive concept to allow easy understanding of energy extraction and conversion through the interaction between light and matter activated directly by mechanical strain. This construction has very low power availability generated by the electromotive force of the metal (or metals) used, due to the small area and the small ratio reached between the area of the metallic surface and the metal mass.

A second embodiment of a quantum generator device was developed with porous lead plates to obtain an energy upgrade when compared to the previously described first embodiment of the quantum generator. Thus, energy extraction and conversion occurs through the interaction between light and matter activated by mechanical strain generated by the electrical forces. FIGS. 6A, 6B, 6C and 6D illustrate it in a non-restrictive form in terms of variations allowed in accordance with the invention. It shows a practical way to implement the technology in an arrangement which achieves the essential characteristics of the second embodiment of the quantum generator with higher power and less metal mass, at the same space with the minor number of plates by pairs of batteries, at least two, operating as quantum capacitors, in a non-restrictive form henceforth referred as batteries (10) and (11) for a better understanding, following the procedures described below.

Firstly, the technology was chosen to achieve the higher ratio between the surface area and the mass of the metal of the free electron reservoir in a given space through the use of the negative porous lead plates, in a non-restrictive form henceforth referred as negative porous lead plates (6) and (7) for a better understanding, composed of micro-particles of pure metal formed by well known techniques of the background art used in the construction of lead acid batteries. The described innovative effect may be improved through the use of thinner plates and smaller particles in order to obtain even higher ratios between the metallic surface areas and the mass of the metal of the free electron reservoir to increase the efficiency of energy generation.

Additionally, the physical arrangement of the negative porous lead plates (6) and (7) in relation to the positive porous lead dioxide plates in a non-restrictive form henceforth referred as positive lead dioxide plates (8) and (9) for a better understanding, inside of the battery (10) and battery (11) makes possible to control the excitement of free electrons gas in the negative porous lead plates (6) and (7) by means of the compression state created by electromotive force from source (12) and the tension state created by discharge through electrical reverse polarized sources (13) as illustrated.

The source (12), as well as the reverse polarized source (13), actuate inside the battery (10) and battery (11) sometimes in the same step and sometimes in different steps times with respect to the two negative lead plates (6) and (7) as well as to the two positive lead dioxide plates (8) and (9), as illustrated in FIGS. 6A, 6B, 6C and 6D, described as follows.

To start its operation, the second embodiment of the quantum generator device should preferably be totally charged, that is: the negative lead plates (6) and (7), as well as the positive lead dioxide plates (8) and (9).

Figure 6A:
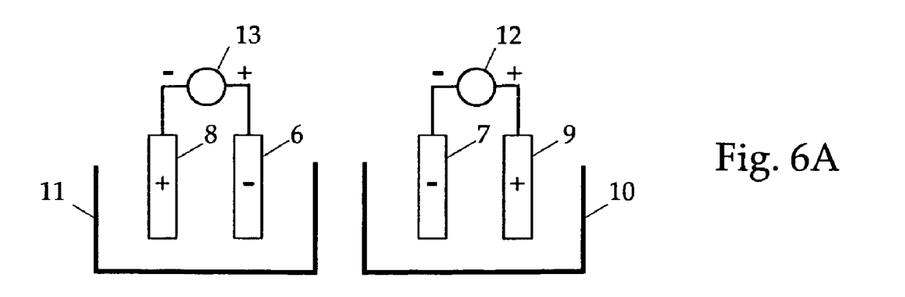
FIGS. 6A, 6B, 6C and 6D represent the arrangement of a second embodiment quantum generator in each of the four steps of the cycle.

In a first step, shown on FIG. 6A, the source (12) is connected between the negative lead plate (7) and positive lead dioxide plate (9) compressing the negative lead plate (7), and the reverse polarized source (13) is connected between the negative lead plate (6) and positive lead dioxide plate (8) placing the negative lead plate (6) under a tensioned state.

Figure 6B:
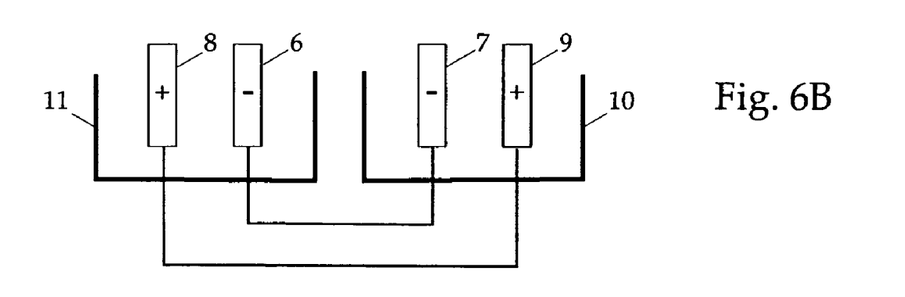

In a second step, shown on FIG. 6B, the negative lead plate (6), tensioned in the first step, is connected to the other negative lead plate (7), compressed in the first step, and the positive lead dioxide plate (8) is connected to the other positive lead dioxide plate (9). The negative lead plate (6) is connected in order to receive the electron gas flow from the negative lead plate (7), compressed in the first step, through the constructive interference of the polarizations of batteries (10) and (11).

Figure 6C:
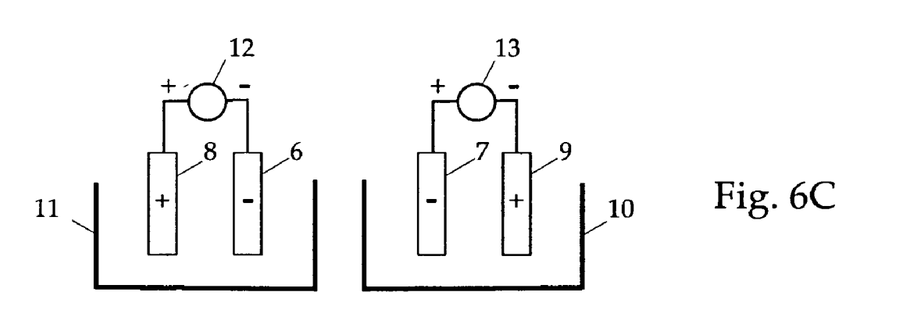

In a third step, shown on FIG. 6C, the source (12) is connected between the negative lead plate (6) and positive lead dioxide plate (8) compressing the negative lead plate (6), and the reverse polarized source (13) is connected between the negative lead plate (7) and positive lead dioxide plate (9) placing the negative lead plate (7) under a tension state.

Figure 6D:
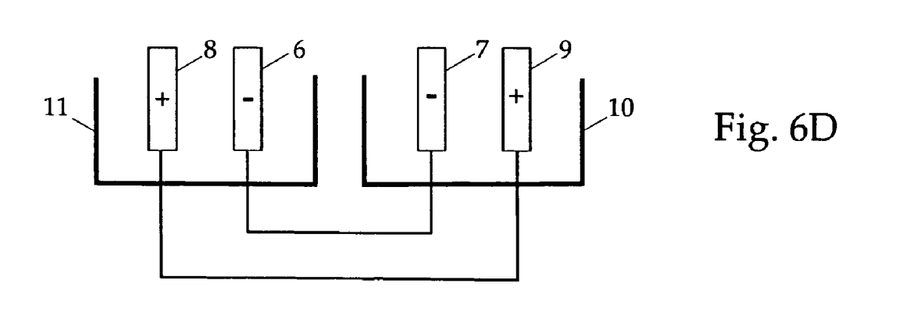

In a fourth step, the negative lead plate (7), tensioned in the third step, is connected to the other negative lead plate (6), compressed in the third step, and the positive lead dioxide plate (8) is connected to the other positive lead dioxide plate (9). The negative lead plate (7) is connected in order to receive the electron gas flow from the negative lead plate (6), compressed in the third step, through the constructive interference of the polarizations of batteries (10) and (11).

The internal electric connection between the plates (6), (7), (8) and (9), the reverse polarized source (13) and the source (12) are switched by a control circuit that alternates this cycle of charge, discharge and release. This control circuit allows that the cycle repeats and is preferably controlled by dedicated software.

The difference between the output energy and the input energy in the cycle shows the generated energy. This generated energy at a given temperature is function of the composition and concentration of the electrolytes in batteries (10) and (11); the batteries and plates geometry; the crystals or particles dimensions; the properties of the negative lead plates (6) and (7) and those of positive lead dioxide (8) and (9); as well as the activation time of each of the four steps.

In an improved embodiment of the invention, the quantum generator device may comprise more than two batteries, being said batteries in pairs, operating as quantum capacitors, with interspaced cycles as described for batteries (10) and (11) in order to obtain direct current. Moreover, each battery may comprise more than one negative porous lead plate (6) and (7) and more than one positive dioxide lead plate (8) and (9), said plates being symmetrically arranged in each battery, alternately connected in cycles as described for negative lead plate (6) and (7) positive dioxide lead plate (8) and (9) in pairs of batteries.

In addition, in the second and fourth steps (FIGS. 6B and 6D) the system may generate energy by the interaction of light and matter operating as a quantum capacitor; and in the first and third steps (FIGS. 6A and 6C) operating as a stress and strain electrical system.

To illustrate and facilitate understanding, we consider the net energy in an application of the second embodiment of the quantum generator device. The porous lead plates used are the same as the plates described previously in this application, with dimension 0.120 m×0.140 m×0.002 m. Moreover, this quantum generator device comprises two experimental open batteries with two positive and two negative plates symmetrically arranged in each battery. The batteries comprise also an electrolyte with aqueous solution of $H_2SO_4$, with a density of 1250 kg/m$^3$, with $Na_2SO_4$ with a density of 1300 kg/M$^3$ at 300K. Each of the batteries used have nominal voltage of 2.04V.

In this illustrative example, to the quantum generator is applied a pulse with the following characteristics:

| Description | Value | Symbol |
|---|---|---|
| Discharge charge | 6.47 C | $Q_D$ |
| Recharge charge | 4.56 C | $Q_R$ |
| Difference between discharge and recharge | 1.91 C | $\Delta Q$ |
| Second or fourth step approx. duration | 1.000 s | $t_T$ |
| First or third step approx. duration | 1.175 s | $t_R = t_D$ |

Some characteristics of this illustrative quantum generator, in each half of the cycle, are:

| Description | Value | Symbol |
|---|---|---|
| Mean generated current | 0.88 A | $\bar{i}$ |
| Mean output voltage | 2.04 V | $\bar{V}$ |
| Mean generated power | 1.79 W | $\bar{P}$ |
| Net energy | 3.89 J | $\Delta E$ |

Thus, a quantum generator with the cited characteristics would generate a net energy of approx. 7.8J in each cycle. The quantum generator and related devices of energy extraction and conversion operates by transferring charges among the plates of the accumulators and/or quantum capacitors, through pulses that stimulate radiation that interacts with matter generating energy through a process that is mainly photoelectric and in this aspect are generally connected and adjusted in a metal that technically facilitates obtaining: larger area-to-mass ratios, low yield point, as well as an adequate relation between the yield point and the modulus of elasticity.

The quantum generator and related devices of energy extraction and conversion can be reproduced in a non-restrictive way, by the existing industry of accumulators, no-break power supplies and electrical power sources, or any related products.

The quantum generator and related devices of energy extraction and conversion can be industrially applied like electrical energy sources, operating like a central unit to supply energy for the switchboard of a whole building. The concept of Home Energy Systems (HES) can be attended, by means of portable individual energy generators.

The quantum generator and related devices of energy extraction and conversion can be also embedded in equipment such as personal computers, telephone centrals, emergency equipment, electronic and electrical equipment transforming them into wireless and rechargeless devices.

In the same way, battery phones, notebooks, and other wireless equipment will have a solution for the inconvenient reduced lifetime of the existing batteries, by the appropriate mode of the quantum generator and related devices of energy extraction and conversion.

The industrial applicability is vast: telecommunication, energy, lighting, automotive, aeronautical, spatial, defense and medical industries, etc., will be attended by the appropriate mode of the quantum generator and related devices of energy extraction and conversion.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A quantum generator device, comprising:
an external metallic shell; and
an internal metallic shell coupled to the external metallic shell by bolts and nuts arranged to place the external metallic shell in tension and the internal metallic shell in compression, the internal metallic shell being electrically isolated from the external metallic shell by dielectrics;
wherein the internal metallic shell and the external metallic shell each have a high diameter-to-thickness ratio.

2. A quantum generator device, comprising:
an external metallic shell having a first end and a second end;
a first dielectric disposed at the first end of the external metallic shell;
a second dielectric disposed at the second end of the external metallic shell;
a plurality of metallic bars disposed within the external metallic shell, electrically isolated from the external metallic shell, and extending through the first dielectric and the second dielectric; and
a plurality of fasteners attached to ends of the metallic bars extending through the first dielectric and the second dielectric and arranged to place the external metallic shell in compression and the plurality of metallic bars in tension;
wherein the external metallic shell has a high diameter-to-thickness ratio.

3. A quantum generator device, comprising:
first and second negative porous lead plates and third and fourth positive porous lead dioxide plates, the first, second, third, and fourth plates being composed of microparticles or particles having smaller than micro-particle dimensions, having a high area-to-mass ratio, and being immersed in a preferentially doped acid solution;
wherein the first plate and the third plate are arranged in a first battery and the second plate and the fourth plate are arranged in a second battery, the first and second batteries operating as quantum capacitors; and
wherein the quantum generator device has a first configuration in which at least one of the first and third plates and the second and fourth plates is placed into a compressed state by a first source having a first polarity, wherein the quantum generator device has a second configuration in which at least the other of the first and third plates and the second and fourth plates is placed into a tensioned state by a second source having a second polarity that is a reverse of the first polarity, and wherein the quantum generator device alternates between the first configuration and the second configuration.

4. The quantum generator device of claim 3, wherein the quantum generator device performs a process for energy extraction and conversion characterized by alternating cycles of discharge by the second source and recharge by the first source with an activation sequence that includes:
a first step wherein the first source is connected between the first plate and the third plate compressing the first plate, and the second source is connected between the second plate and the fourth plate placing the second plate under tension;
a second step wherein the second plate is connected to the first plate and the third plate is connected to the fourth plate;
a third step wherein the first source is connected between the second plate and the fourth plate compressing the second plate, and the second source is connected between the first plate and the third plate placing the first plate under tension;
a fourth step wherein the first plate is connected to the second plate and the third plate is connected to the fourth plate; and
wherein in a next period the first, second, third and fourth steps are repeated.

5. The quantum generator device of claim 4, wherein connections between the first, second, third, and fourth plates and the first and second sources are switched by a control circuit that alternates the cycles of discharge and recharge based upon a software program.

6. The quantum generator device of claim 3, wherein connections between the first, second, third, and fourth plates and the first and second sources that effect the compressed state and the tensioned state are switched by a control circuit that alternates the cycles of discharge and recharge based upon a software program.

7. A method of generating energy using a pair of batteries as quantum capacitors, each battery of the pair having metallic electrodes, comprising steps of:

submitting at least one metallic electrode of one battery of the pair of batteries to a tensioned state, while at least one metallic electrode of the other battery of the pair of batteries is submitted to a compressed state; and in a next step, interconnecting the at least one metallic electrode under tension and the at least one metallic electrode under compression.

* * * * *